(12) United States Patent
Hirata et al.

(10) Patent No.: US 11,876,429 B2
(45) Date of Patent: Jan. 16, 2024

(54) VIBRATION MOTOR AND HAPTIC DEVICE

(71) Applicant: NIDEC CORPORATION, Kyoto (JP)

(72) Inventors: Atsunori Hirata, Kyoto (JP); Daisuke Adachi, Kyoto (JP); Hiroaki Hirano, Kyoto (JP); Tomohiro Kobayashi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 86 days.

(21) Appl. No.: 17/726,448

(22) Filed: Apr. 21, 2022

(65) Prior Publication Data

US 2022/0345019 A1 Oct. 27, 2022

(30) Foreign Application Priority Data

Apr. 23, 2021 (JP) ................................. 2021-073275
Mar. 31, 2022 (JP) ................................. 2022-058220

(51) Int. Cl.
*H02K 33/12* (2006.01)

(52) U.S. Cl.
CPC ................................... *H02K 33/12* (2013.01)

(58) Field of Classification Search
CPC .. H02K 7/1869; H02K 7/1876; H02K 7/1892; H02K 33/12; H02K 33/00; H02K 33/02; H02K 33/16; H02K 35/00; H02K 35/02; H02K 33/04; H02K 33/06; H02K 5/02; H02K 5/04; H02K 5/22
USPC ............ 310/309, 15–25, 12.01, 81, 80, 321, 310/28–30, 36–37, 40 MM
See application file for complete search history.

(56) References Cited

U.S. PATENT DOCUMENTS

| | | | | |
|---|---|---|---|---|
| 5,661,352 A * | 8/1997 | Oguchi | .................. | H02K 5/225 310/71 |
| 5,705,866 A * | 1/1998 | Oguchi | .................. | H02K 1/187 310/90 |
| 5,730,619 A * | 3/1998 | Hamlin | ................ | H01R 13/193 439/573 |
| 6,121,701 A * | 9/2000 | Kloeppel | ........... | G11B 19/2009 310/71 |
| 6,271,610 B1 * | 8/2001 | Ibata | ........................ | H02K 5/00 310/40 MM |
| 6,413,117 B1 * | 7/2002 | Annerino | ........... | H01R 12/7076 439/500 |
| 7,579,731 B2 * | 8/2009 | Fukushima | .......... | H02K 5/1672 310/40 MM |
| 7,646,122 B2 * | 1/2010 | Uchiumi | .................. | H02K 5/00 310/91 |

(Continued)

*Primary Examiner* — Maged M Almawri
(74) *Attorney, Agent, or Firm* — HAUPTMAN HAM, LLP

(57) ABSTRACT

A vibration motor includes a stationary portion and a movable portion vibrable in an axis direction with respect to the stationary portion. The stationary portion includes a coil and a housing. The housing includes a first region expanding in a first direction orthogonal to the axis direction, and a second region disposed on one side in a second direction orthogonal to the axis direction and the first direction relative to the first region and expanding in the first direction. In a cross-section across the axis direction, a distance in the second direction between the second region and the first region is longest at a center in the first direction of the first region. In the cross-section, a shape formed by the first and second regions is asymmetric with respect to an axis extending parallel to the first direction through a center of the housing in the second direction.

20 Claims, 11 Drawing Sheets

(56) References Cited

U.S. PATENT DOCUMENTS

| | | | | |
|---|---|---|---|---|
| 7,825,555 B2* | 11/2010 | Uchiumi | ................ | H02K 5/225 |
| | | | | 310/91 |
| 9,742,240 B2* | 8/2017 | Katada | ................... | H02K 5/225 |
| 10,111,324 B2* | 10/2018 | Koepsell | ................ | H05K 1/028 |
| 2001/0013730 A1* | 8/2001 | Yamaguchi | ............ | H02K 23/54 |
| | | | | 310/DIG. 6 |
| 2005/0046302 A1* | 3/2005 | Suzuki | ................... | H02K 7/061 |
| | | | | 310/239 |
| 2005/0073205 A1* | 4/2005 | Takagi | .................... | H02K 5/00 |
| | | | | 310/89 |
| 2006/0138885 A1* | 6/2006 | Uchiumi | ................. | H02K 5/00 |
| | | | | 310/71 |
| 2008/0291650 A1* | 11/2008 | Hautvast | ................ | H02K 5/225 |
| | | | | 361/772 |
| 2009/0039721 A1* | 2/2009 | Takagi | ................... | H05K 3/341 |
| | | | | 310/81 |
| 2010/0102645 A1* | 4/2010 | Trietz | ....................... | H02N 2/04 |
| | | | | 310/12.31 |
| 2011/0291510 A1* | 12/2011 | Hara | ...................... | H02K 7/061 |
| | | | | 310/91 |
| 2014/0035397 A1* | 2/2014 | Endo | ...................... | H02K 33/18 |
| | | | | 310/30 |
| 2019/0379263 A1* | 12/2019 | Zhu | ......................... | H02K 33/06 |
| 2020/0076287 A1 | 3/2020 | Takahashi et al. | | |

* cited by examiner

VIBRATION MOTOR AND HAPTIC DEVICE

CROSS-REFERENCE TO RELATED APPLICATIONS

The present invention claims priority under 35 U.S.C. § 119 to Japanese Patent Application No. 2021-073275 filed on Apr. 23, 2021 and Japanese Patent Application No. 2022-058220 filed on Mar. 31, 2022, the entire contents of which are incorporated herein by reference.

FIELD OF THE INVENTION

The present disclosure relates to a vibration motor and a haptic device.

BACKGROUND

Conventionally, various apparatuses such as a smartphone and other portable devices include a vibration motor as a vibration generation device. The vibration motor is used for a function of notifying the user of an incoming call, an alarm, and the like, or a function of haptic feedback in a human interface, for example.

The conventional vibration motor includes a stationary portion, an elastic member, and a movable portion. The stationary portion includes a housing and a coil. The movable portion and the housing are connected by the elastic member. When the coil is energized to generate a magnetic field, the movable portion vibrates.

Conventionally, the outer shape of the housing is often a rectangular parallelepiped shape or a cylindrical shape. The outer shape of the housing forms the outer shape of the vibration motor. Due to this, the degree of freedom in shape design of the vibration motor has been limited.

SUMMARY

An exemplary vibration motor of the present disclosure includes a stationary portion and a movable portion capable of vibrating in a central axis direction with respect to the stationary portion. The stationary portion includes a coil surrounding a radially outward of the movable portion, and a housing accommodating the movable portion and the coil. The housing includes a housing first region expanding in a first direction orthogonal to the central axis direction, and a housing second region disposed on one side in a second direction orthogonal to the central axis direction and the first direction relative to the housing first region and expanding in the first direction. In a cross-sectional view orthogonal to the central axis direction, a distance in the second direction between the housing second region and the housing first region is longest at a center position in the first direction of the housing first region. In the cross-sectional view, a shape formed by the housing first region and the housing second region is asymmetric with respect to an axis extending parallel to the first direction through a center position of the housing in the second direction.

An exemplary vibration motor according to another aspect of the present disclosure includes a stationary portion and a movable portion capable of vibrating in a central axis direction with respect to the stationary portion. The stationary portion includes a coil surrounding a radially outward of the movable portion, and a housing accommodating the movable portion and the coil. The housing includes a housing first region expanding in a first direction orthogonal to the central axis direction, a housing second region disposed on both sides of the housing first region in the first direction, and a housing third region that is disposed on one side in a second direction orthogonal to the central axis direction and the first direction relative to the housing first region, expands in the first direction, and is connected to the housing first region in the second direction by the housing second region. In a cross-sectional view orthogonal to the central axis direction, a shape formed by the housing first region, the housing second region, and the housing third region is symmetrical with respect to an axis extending parallel to the first direction through a center position of the housing in the second direction. The housing second region has a bent part bent in an arc shape. A width of the housing first region in the first direction is larger than a width of the housing second region and smaller than twice the width of the housing second region.

The above and other elements, features, steps, characteristics and advantages of the present disclosure will become more apparent from the following detailed description of the preferred embodiments with reference to the attached drawings.

DETAILED DESCRIPTION

Figure 1:
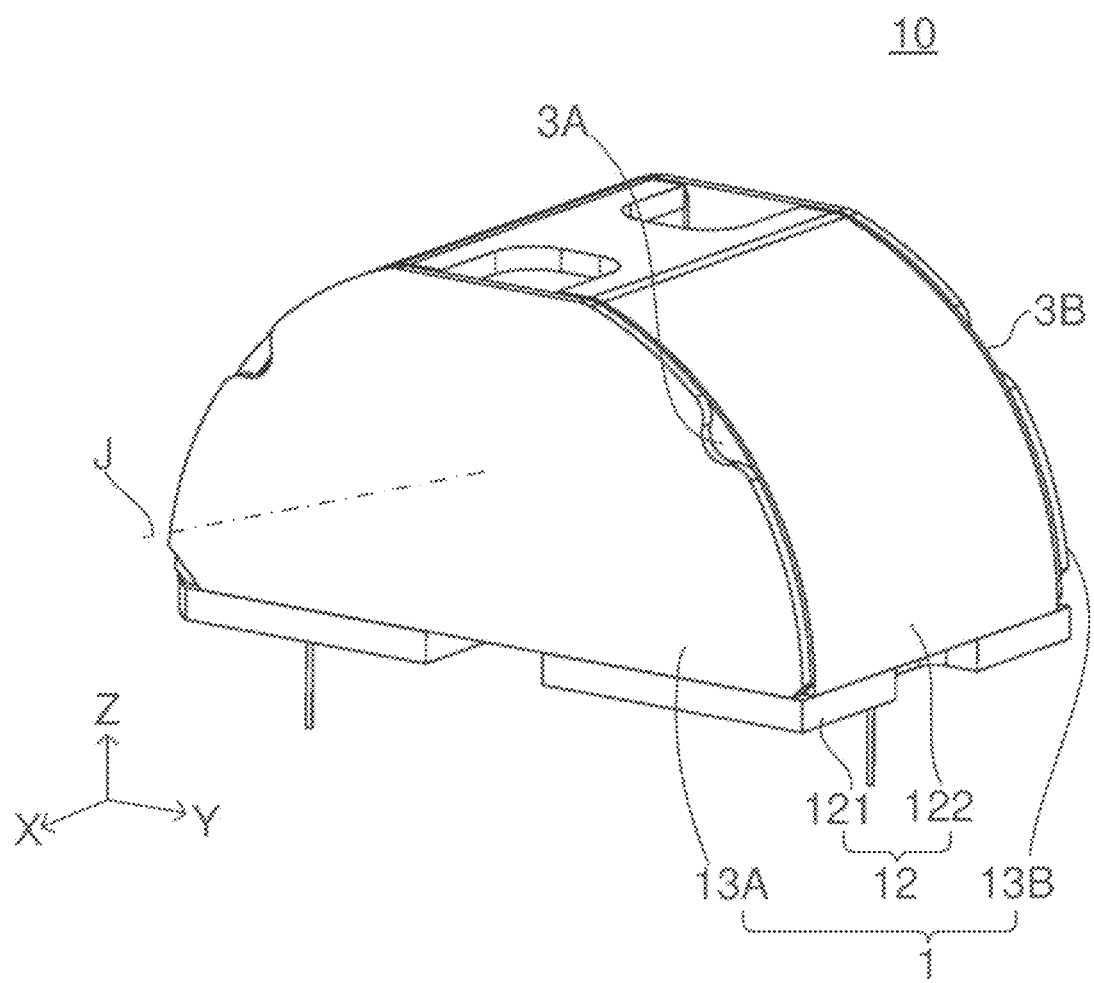
FIG. 1 is a perspective view of a vibration motor according to an exemplary embodiment of the present disclosure.

Exemplary embodiments of the present disclosure will be described below with reference to the drawings.

In the drawings, the "central axis direction" in which central axes J of vibration motors 10 and 50 extend is indicated as an X direction. In the drawings, an arrow side in the X direction indicates "one side in the central axis direction", and an opposite side indicates the "the other side in the central axis direction".

In the drawings, a first direction orthogonal to the central axis J direction is indicated as a Y direction. In the drawings, an arrow side in the Y direction indicates "one side in the first direction Y", and an opposite side indicates the "the other side in the first direction Y". In the drawings, a second direction orthogonal to the central axis J direction and the first direction Y is indicated as a Z direction. An arrow side in the Z direction indicates "one side in the second direction Z", and the opposite side indicates the "the other side in the second direction Z".

A direction orthogonal to the central axis J is referred to as a "radial direction (radial/radially)". A direction around the central axis J is referred to as a "circumferential direction (circumferential/circumferentially)". The above directions are merely introduced to describe the configurations of the vibration motors 10 and 50 and a haptic device 40, and do not limit the attitudes at the time of use of the vibration motors 10 and 50 and the haptic device 40.

Figure 2:
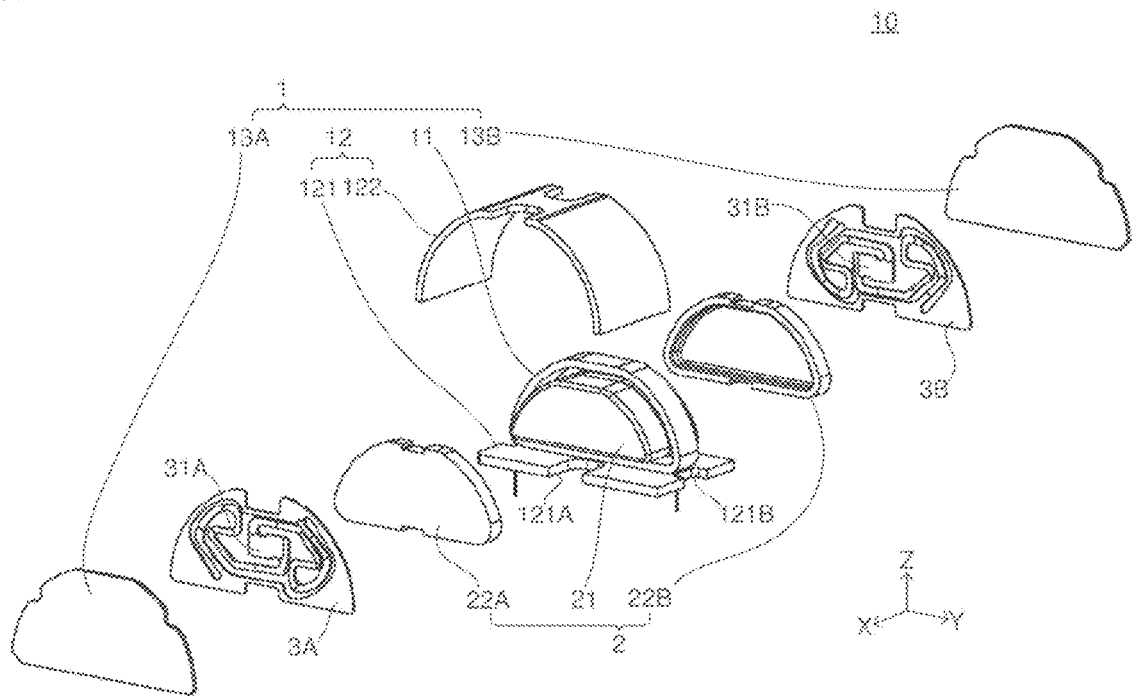
FIG. 2 is an exploded perspective view of the vibration motor.

FIG. 1 is a perspective view of the vibration motor 10 according to an exemplary embodiment of the present disclosure. FIG. 2 is an exploded perspective view of the vibration motor 10 shown in FIG. 1.

The vibration motor 10 includes a stationary portion 1 and a movable portion 2. In the present embodiment, the vibration motor 10 further includes elastic members 3A and 3B and lid portions 13A and 13B. The movable portion 2 extends along the central axis J. The movable portion 2 is capable of vibrating in the central axis J direction with respect to the stationary portion 1.

The stationary portion 1 includes a coil 11 and a housing 12. The stationary portion 1 further includes the lid portions 13A and 13B.

The coil 11 is formed by winding a conductive wire around the central axis J radially outward of a core portion 21 included in the movable portion 2 described later. That is, the stationary portion 1 includes the coil 11 surrounding the radially outward of the movable portion 2.

Figure 3:
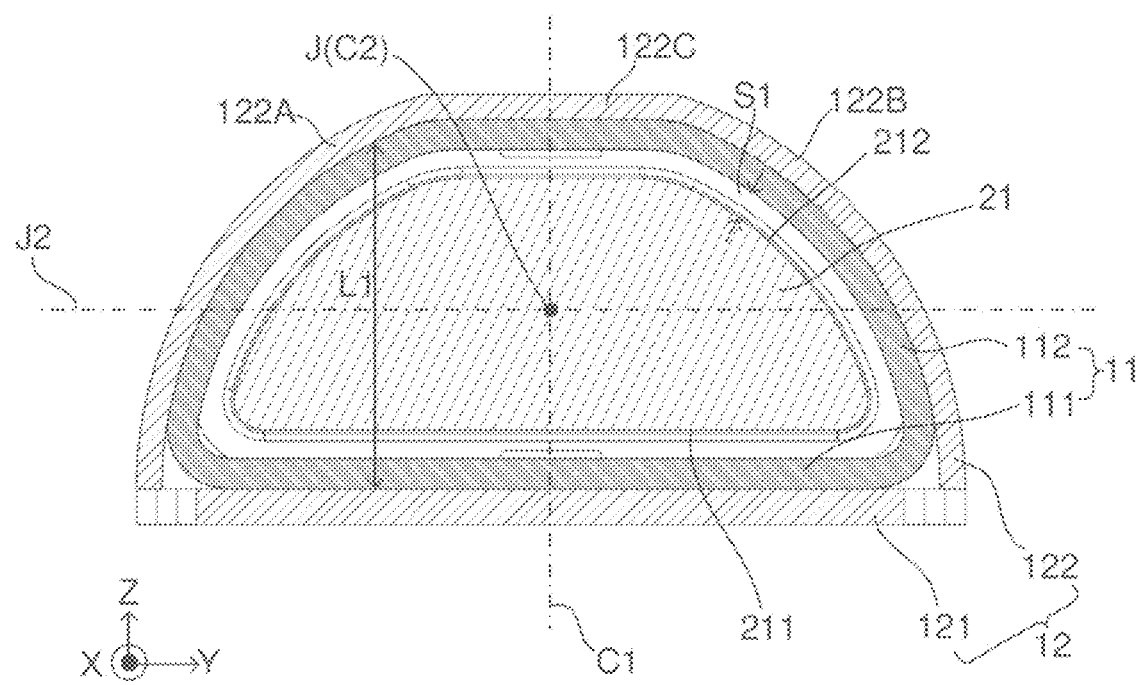
FIG. 3 is a cross-sectional view of a part of a core portion of the vibration motor taken along with a cut surface orthogonal to the central axis direction.

Here, FIG. 3 is a cross-sectional view of a part of the core portion 21 of the vibration motor 10 taken along with a cut surface orthogonal to the central axis J direction. The housing 12 will be described with reference to FIG. 3 in addition to FIGS. 1 and 2.

The housing 12 has a housing first region 121 and a housing second region 122. The movable portion 2 and the coil 11 are accommodated in an accommodation space formed by combining the housing first region 121 and the housing second region 122. That is, the stationary portion 1 includes the housing 12 that accommodates the movable portion 2 and the coil 11. The housing 12 is formed of a magnetic body. The magnetic body is stainless steel, for example.

The housing first region 121 expands in the first direction Y. In the present embodiment, the housing first region 121 is formed in a flat plate shape expanding in the first direction Y and the central axis J direction. That is, the housing first region 121 is a flat plate-like site expanding in the first direction Y. This facilitates molding of the housing first region 121.

The housing second region 122 has a plate shape extending in the first direction Y and expanding in the central axis J direction. The housing second region 122 includes a first bent part 122A bent in an arc shape in a cross-sectional view orthogonal to the central axis J, a flat plate part 122C having a flat plate shape, and a second bent part 122B bent in an arc shape in the cross-sectional view orthogonal to the central axis J. The first bent part 122A, the flat plate part 122C, and the second bent part 122B are coupled in order from the other side in the first direction Y to form the housing second region 122. Due to this, the housing second region 122 is formed in a substantially semicircular shape in the cross-sectional view. The entire housing second region 122 may form a semicircle in the cross-sectional view.

The other end part in the second direction of the first bent part 122A is disposed on one side in the second direction Z of the other end part in the first direction Y of the housing first region 121, and is fixed to the other end part in the first direction Y of the housing first region 121. The other end part in the second direction Z of the second bent part 122B is disposed on one side in the second direction Z of one end part in the first direction Y of the housing first region 121, and is fixed to the one end part in the first direction Y of the housing first region 121. The fixing is performed by welding, for example.

That is, the housing second region 122 is a site that connects one end part in the first direction Y and the other end part in the first direction Y of the housing first region 121, is convex on one side in the second direction Z, and has an arc shape in at least a part in the cross-sectional view. This facilitates molding of the housing second region 122.

As described above, the housing 12 has the housing second region 122 that is disposed on one side in the second direction Z relative to the housing first region 121 and expands in the first direction Y.

As shown in FIG. 3, in the cross-sectional view orthogonal to the central axis J, a distance L1 in the second direction Z between the housing second region 122 and the housing first region 121 is longest at a center position C1 in the first direction Y of the housing first region 121.

As shown in FIG. 3, in the cross-sectional view, the outer shape of the housing 12 is asymmetric with respect to an axis J2 passing through a center position C2 of the housing 12 in the second direction Z and extending parallel to the first direction Y. In the example shown in FIG. 3, the outer shape of the housing 12 is formed by a substantially semicircular shape in the housing second region 122 and a side of one end part in the first direction Y, a side of the other end part in the first direction Y, and a side of the other end part in the second direction Z in the housing first region 121.

The center position C2 in the second direction Z is the center position C2 in the second direction Z between a point located closest to one side in the second direction Z in the housing second region 122 and a point located closest to the other side in the second direction Z in the housing first region 121 in the cross-sectional view. In the example shown in FIG. 3, the point located closest to one side in the second direction Z in the housing second region 122 is a point included in a side on one side in the second direction Z of the flat plate part 122C, and the point located closest to the other side in the second direction Z in the housing first region 121 is a point included in a side on the other side in the second direction Z in the housing first region 121 having a flat plate shape.

That is, in the cross-sectional view, the shape formed by the housing first region 121 and the housing second region 122 is asymmetric with respect to the axis J2 passing through the center position C2 of the housing 12 in the second direction Z and extending parallel to the first direction Y.

As described above, according to the vibration motor 10 of the present embodiment, the configuration of the housing 12 as described above can improve the degree of freedom in shape design of the vibration motor 10. That is, the outer shape of the vibration motor 10 can be optimized by optimizing the shape of the housing 12. The outer shape of the vibration motor 10 can be optimized in accordance with the shape of the region where the vibration motor 10 is disposed.

Not limited to the shape shown in FIG. 3, the housing second region 122 may have a triangular shape convex toward one side in the second direction Z, for example, and the housing first region 121 may have a part of an elliptical shape convex toward the other side in the second direction Z, for example, in the cross-sectional view.

The configuration of the coil 11 will be described more specifically. As shown in FIG. 3, the coil 11 includes a coil first region 111 along the housing first region 121 and a coil second region 112 along the housing second region 122. This makes it possible to increase the size of the coil 11 inside the housing 12 when the size of the housing 12 is constant.

The coil first region 111 is fixed to the housing first region 121. The coil second region 112 is fixed to the housing second region 122. The fixing is performed by adhesion, for example. This makes it possible to fix the coil 11 to the housing 12. Heat generated when current flows through the coil 11 can be transmitted to the housing 12 to dissipate heat.

As shown in FIG. 2, the movable portion 2 includes the core portion 21 and holders 22A and 22B. The core portion 21 is a member expanding in the first direction Y and the second direction Z and extending in the central axis J direction.

Figure 4:
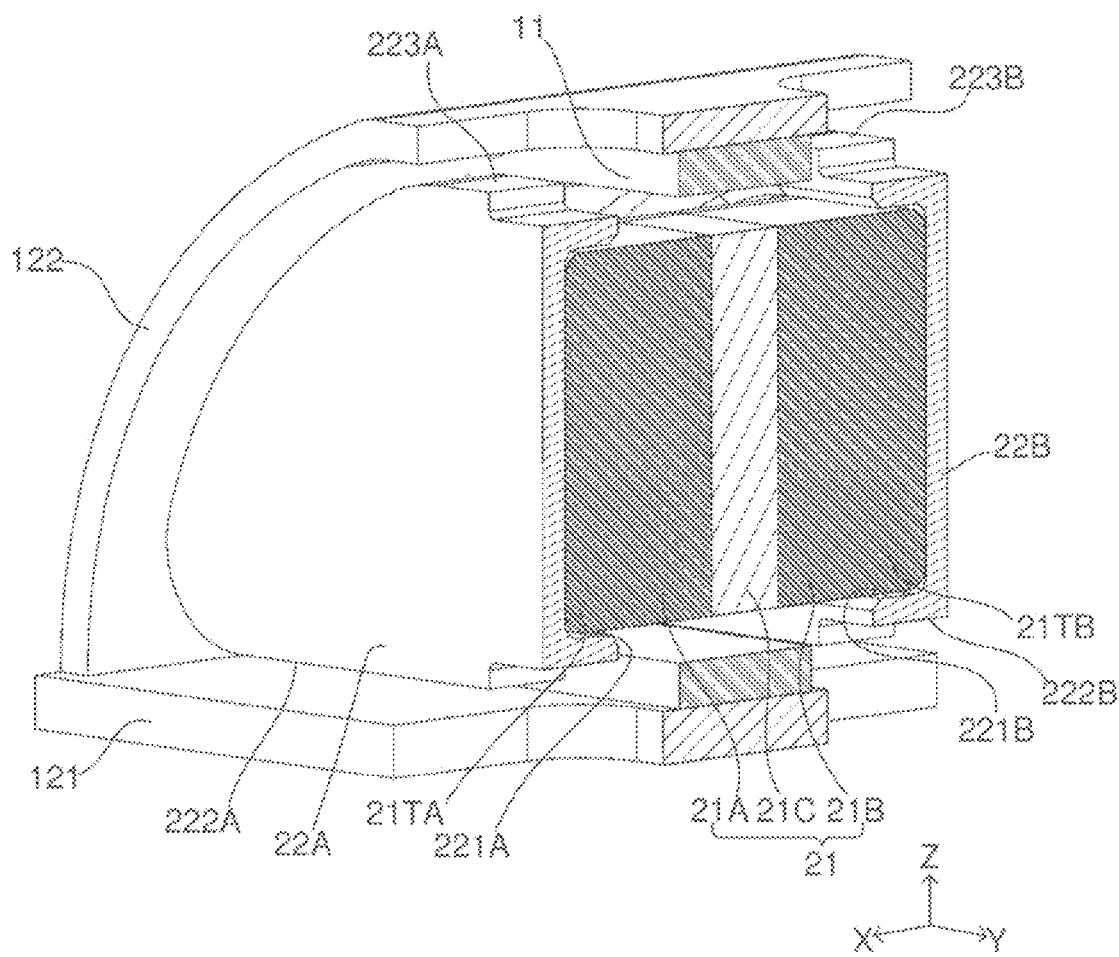
FIG. 4 is a cross-sectional perspective view showing a cross section of a part of the vibration motor taken along with a cut surface orthogonal to the first direction at the center position in the first direction.

Here, FIG. 4 is a cross-sectional perspective view showing a cross section of a part of the vibration motor 10 taken along with a cut surface orthogonal to the first direction Y at the center position in the first direction Y. As shown in FIG. 4, the core portion 21 includes two magnets 21A and 21B arranged in the central axis J direction, and a magnetic body 21C disposed to be held between the magnets 21A and 21B in the central axis J direction. That is, the movable portion 2 has the core portion 21 including the magnets 21A and 21B. For example, the other side in the central axis J direction of the magnet 21A on one side in the central axis J direction is the N pole, and one side in the central axis J direction is the S pole. One side in the central axis J direction of the magnet 21B on the other side in the central axis J direction is the N pole, and the other side in the central axis J direction is the S pole. That is, the N poles oppose each other in the central axis J direction across the magnetic body 21C. Since the housing 12 is made of a magnetic body, it is possible to suppress the magnetic field generated by the magnets 21A and 21B and the coil 11 from leaking to the outside of the vibration motor 10 and possible to increase the magnetic force. The magnetic poles of the magnets 21A and 21B may be opposite to the above in the central axis J direction.

As shown in FIG. 3, the core portion 21 has a first outer surface 211 along the coil first region 111 and a second outer surface 212 along the coil second region 112. Due to this, when the size of the coil 11 is constant, it is possible to increase the size of the core portion 21 and enhance the magnetic efficiency. By increasing the size of the core portion 21, it is possible to increase the weight of the movable portion 2 and improve the vibration characteristics.

As shown in FIG. 3, in the cross-sectional view, a gap S1 between the outer surface of the core portion 21 and an inner surface of the coil 11 is substantially constant in the entire circumferential direction. Due to this, when the size of the coil 11 is constant, it is possible to further increase the size of the core portion 21.

As shown in FIG. 4, the holder 22A holds a one end part 21TA of the central axis J in the core portion 21. The holder 22A has a recess part 221A recessed on one side of the central axis J. The one end part 21TA of the central axis J is disposed in the recess part 221A. The one end part 21TA of the central axis J is fixed to the recess part 221A by adhesion, for example. At least a part of the holder 22A is disposed on one side of the central axis J relative to the coil 11.

Similarly, the holder 22B holds the other end part 21TB of the central axis J in the core portion 21. The holder 22B has a recess part 221B recessed on the other side of the central axis J. The other end part 21TB of the central axis J is disposed in the recess part 221B. The other end part 21TB of the central axis J is fixed to the recess part 221B by adhesion, for example. At least a part of the holder 22B is disposed on the other side of the central axis J relative to the coil 11.

The holders 22A and 22B function as weights, and are made of metal, for example. An example of the metal is a tungsten alloy. The holders 22A and 22B correspond to outward sites disposed on one side or the other side in the central axis J direction relative to the coil 11.

As shown in FIG. 2, a center part 31A of the elastic member 3A is disposed on one side in the central axis J direction of the holder 22A. The center part 31A is fixed to the holder 22A by welding, for example. The outer edge part of the elastic member 3A is fixed to an end face on one side of the central axis J of the housing second region 122 by welding, for example. As shown in FIG. 2, a center part 31B of the elastic member 3B is disposed on the other side in the central axis J direction of the holder 22B. The center part 31B is fixed to the holder 22B by welding, for example. The outer edge part of the elastic member 3B is fixed to an end face on the other side of the central axis J of the housing second region 122 by welding, for example. Due to this, the movable portion 2 is supported to be able to vibrate in the central axis J direction with respect to the housing 12.

The lid portion 13A covers at least a part of one side of the central axis J of the elastic member 3A, and is fixed to the elastic member 3A by welding, for example. The lid portion 13B covers at least a part of the other side of the central axis J of the elastic member 3B, and is fixed to the elastic member 3B by welding, for example. This makes it possible to suppress foreign matters from entering the housing 12.

As shown in FIG. 4, the holder 22A has a third outer surface 222A along the housing first region 121 and a fourth outer surface 223A along the housing second region 122. Similarly, the holder 22B has a third outer surface 222B along the housing first region 121 and a fourth outer surface 223B along the housing second region 122. The distance between the third outer surfaces 222A and 222B and the housing 12 and the distance between the fourth outer surfaces 223A and 223B and the housing 12 are shorter than the distance between the radially inner surface of the coil 11 and the housing 12.

Thus, the movable portion 2 has an outward site (22A and 22B) disposed on one side or the other side of the central axis J of the coil 11. The outward site has the third outer surfaces 222A and 222B along the housing first region 121 and the fourth outer surfaces 223A and 223B along the housing second region 122. Due to this, when the size of the housing 12 is constant, by increasing the size of the outward site, it is possible to increase the mass of the movable portion 2 and improve the vibration characteristics.

The movable portion 2 includes the magnets 21A and 21B and the holders 22A and 22B to which the elastic members 3A and 3B are fixed and which hold the magnets 21A and 21B. The outward sites are the holders 22A and 22B. Consequently, the mass of movable portion 2 can be increased by increasing the sizes of the holders 22A and 22B that facilitate fixing of the elastic members 3A and 3B to the movable portion 2. The holders 22A and 22B can increase the weight of the movable portion 2 while making the shapes of the magnets 21A and 21B easy to mold.

Figure 5:
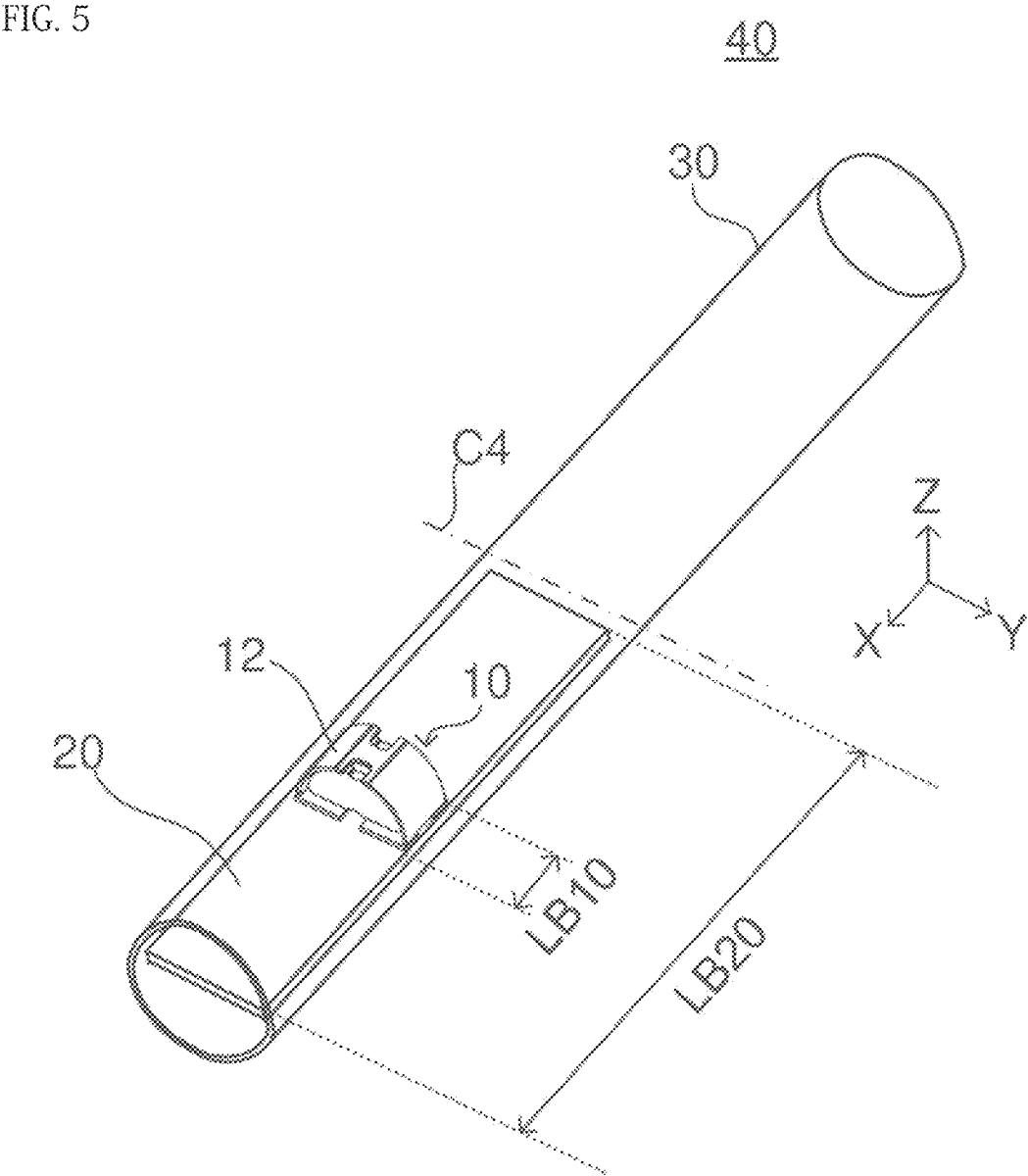
FIG. 5 is a view schematically showing a configuration example of a haptic device equipped with the vibration motor.

Next, the haptic device 40 equipped with the vibration motor 10 as described above will be described. FIG. 5 is a view schematically showing the configuration of the haptic device 40 equipped with the vibration motor 10. The haptic device is, for example, a stylus, and FIG. 5 shows a part of the haptic device 40. When the haptic device 40 is a stylus, a pen tip end (not illustrated) is attached to a tip end part on one side of the central axis J of a chassis 30 shown in FIG. 5.

Figure 6:
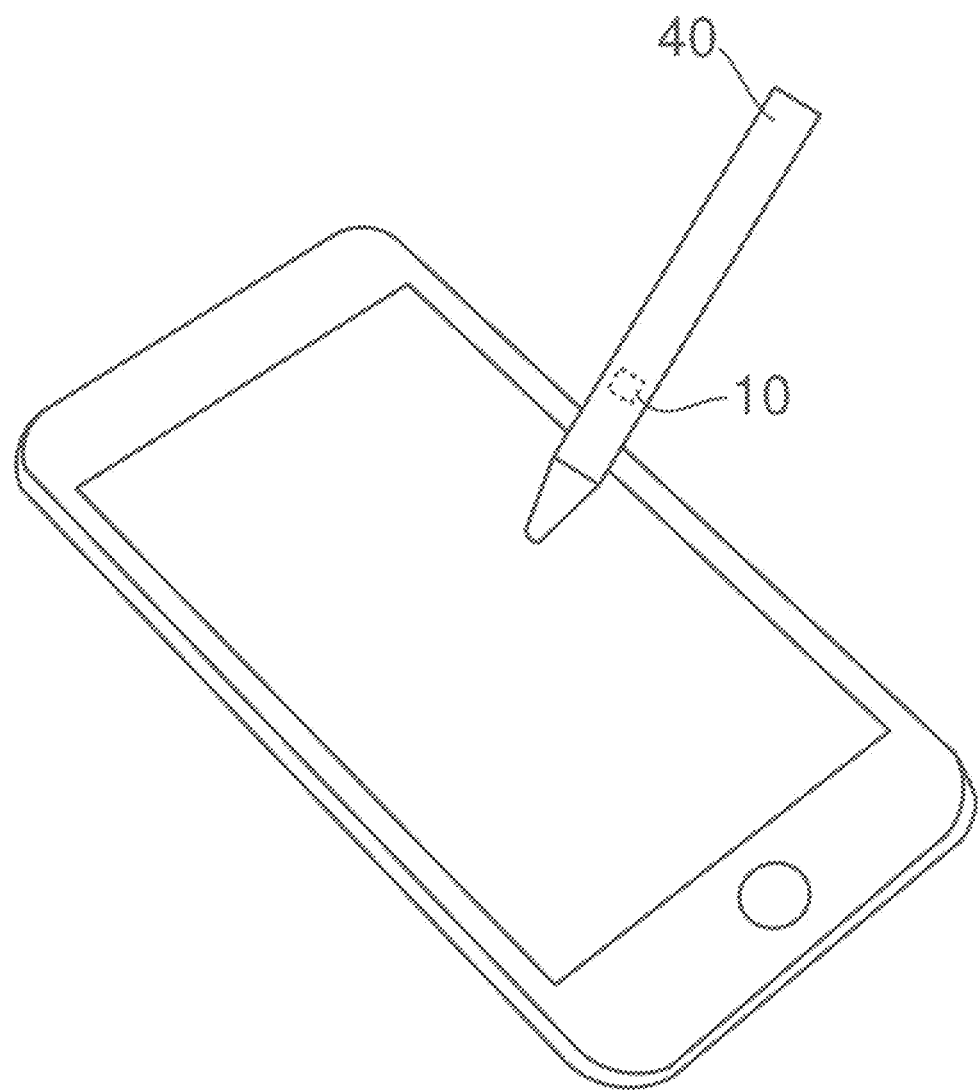
FIG. 6 is a view schematically showing a stylus equipped with the vibration motor.

As shown in FIG. 6, a stylus (the haptic device) 40 is a device that operates an apparatus such as a smartphone or a tablet by being brought into contact with a touchscreen of the apparatus. By equipping the stylus 40 with the vibration motor 10, it is possible to vibrate the stylus 40 to give the user haptic feedback. That is, the stylus 40 is an example of a haptic device including the vibration motor 10. That is, the haptic device includes the vibration motor 10. For example, haptic feedback can give the user a feeling as if the user writes a character or the like on paper or the like with the stylus 40.

Returning the description to FIG. 5, the haptic device 40 includes the chassis 30, a substrate 20, and the vibration motor 10. The chassis 30 has a cylindrical shape extending in the central axis J direction. The vibration motor 10 is mounted on the substrate 20. The vibration motor 10 and the substrate 20 are accommodated inside the chassis 30. In FIG. 5, for convenience, the vibration motor 10 and the substrate 20 are illustrated in a transparent manner. The configuration of the vibration motor 10 is partially illustrated.

That is, the haptic device 40 includes the chassis 30 having a tubular shape extending in the central axis J direction and the vibration motor 10 accommodated in the chassis 30. This makes it possible to design the shape of the vibration motor 10 in accordance with the shape of the chassis 30. In the example shown in FIG. 5, the arc shape in the outer shape of the vibration motor 10 can be along the radially inner surface of the chassis 30 having the cylindrical shape. Therefore, it is possible to design the outer shape of the vibration motor 10 so as to effectively use the space inside the chassis 30, the size of the vibration motor 10 can be increased, and it is possible to improve the vibration characteristics.

Not limited to the example shown in FIG. 5, the outer shape of the vibration motor may have a substantially triangular shape with respect to a rectangular tubular chassis, for example, and the outer shape of the vibration motor may be along the radially inner surface of the chassis.

Figure 7:
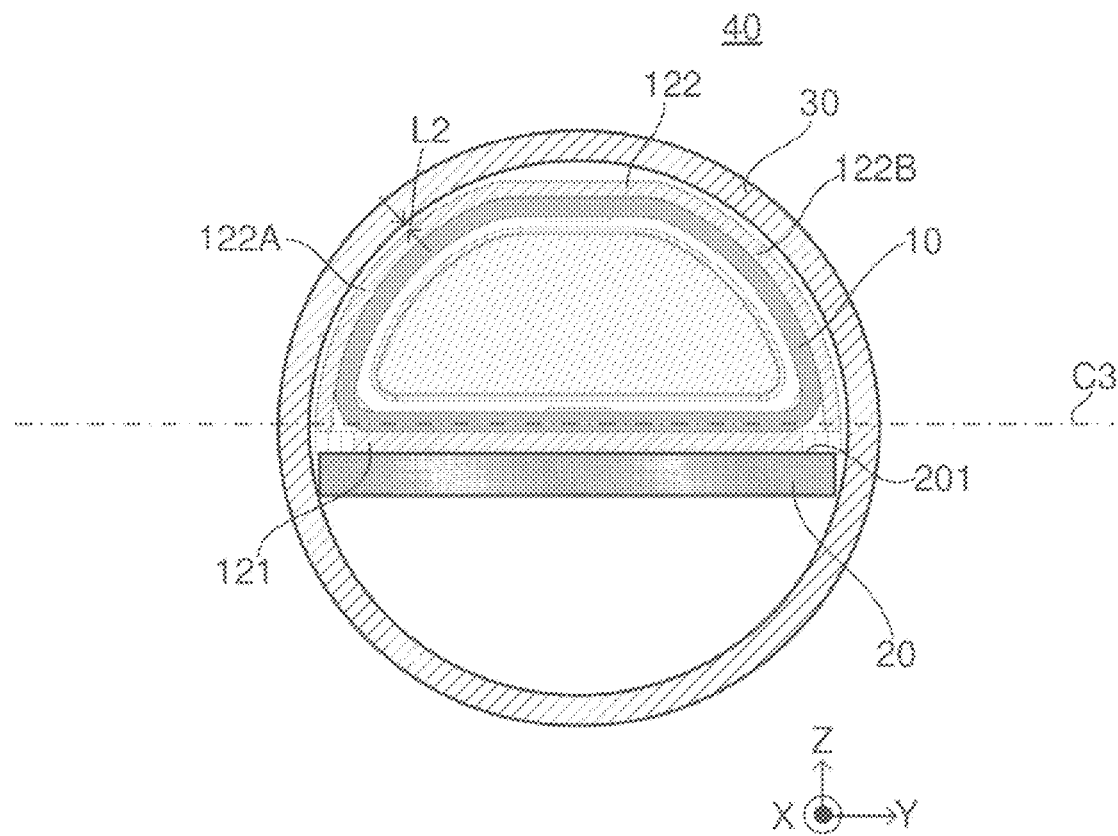
FIG. 7 is a cross-sectional view with a cross section orthogonal to the central axis of the haptic device.

FIG. 7 is a cross-sectional view with a cross section orthogonal to the central axis J of the haptic device 40. As shown in FIG. 7, a distance L2 between the first bent part 122A having the arc shape and the second bent part 122B having the arc shape in the housing second region 122 and the radially inner surface of the chassis 30 is substantially constant in the circumferential direction. That is, in the cross-sectional view, the distance L2 between at least a part of the housing second region 122 and the radially inner surface of the chassis 30 is substantially constant in the circumferential direction. This makes it possible to increase the size of the housing 12 inside the chassis 30.

As shown in FIG. 7, the housing first region 121 is fixed to a substrate surface 201 on one side in the second direction Z in the substrate 20 by adhesion, for example. That is, the haptic device 40 includes the substrate 20 accommodated in the chassis 30, and the housing first region 121 is fixed to the substrate 20. This makes it possible to fix the vibration motor 10 to the substrate 20. In particular, since the housing first region 121 has a flat plate shape, it is easy to fix the housing first region 121 to the substrate 20 having the flat plate shape.

Figure 8:
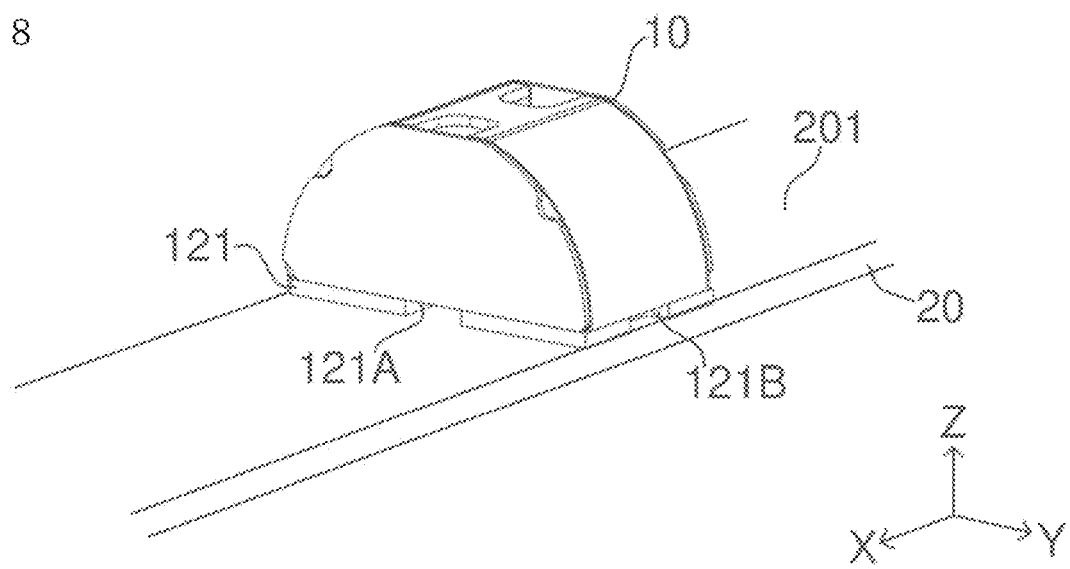
FIG. 8 is a partial perspective view showing a configuration in which the vibration motor is mounted on a substrate.

Here, FIG. 8 is a partial perspective view showing the configuration in which the vibration motor 10 is mounted on the substrate 20. As shown in FIG. 8 (FIG. 2), the housing first region 121 has notch parts 121A and 121B notched inward from the outer edge. This allows a lead wire of the coil 11 to be electrically connected to the substrate 20 through the notch parts 121A and 121B, and the electrical connection between the coil 11 and the substrate 20 becomes easy.

The notch part 121A is disposed at the center position in the first direction Y of the housing first region 121. This makes it possible to electrically connect the lead wire to an electrode disposed at the center position in the first direction Y of the substrate 20. Even when the electrode is disposed at a position other than the center position in the first direction Y, it is possible to suppress an extremely long connection length between the electrode and the coil 11.

The notch part 121B is disposed at the end part in the first direction Y of the housing first region 121. This makes it possible to electrically connect the lead wire to an electrode disposed at the end part in the first direction Y of the substrate 20.

As described above, the housing first region 121 has the notch parts 121A and 121B notched inward from the outer edge. The lead wire of the coil 11 is electrically connected to the substrate 20 through the notch parts 121A and 121B. This allows the coil 11 to be electrically connected to the substrate 20 by a short lead wire.

As shown in FIG. 7, the substrate 20 is disposed on the other side in the second direction Z relative to a center position C3 in the second direction Z of the chassis 30. This makes it possible to increase a space on one side in the second direction Z relative to the substrate 20 inside the chassis 30, and increase the size of the vibration motor 10 disposed in the space.

As shown in FIG. 5, a length LB10 of the housing 12 in the central axis J direction is equal to or less than half of a length LB20 of the substrate 20 in the central axis J direction. This improves the degree of freedom in the haptic device 40 in adjusting the region where vibration is generated and the center-of-gravity position.

As shown in FIG. 5, the substrate 20 is disposed on one side in the central axis J direction relative to a center position C4 in the central axis J direction of the chassis 30. This improves the degree of freedom in adjusting the arrangement positions of the substrate 20 and the vibration motor 10 inside the haptic device 40 and the center-of-gravity position of the haptic device 40.

Figure 9:
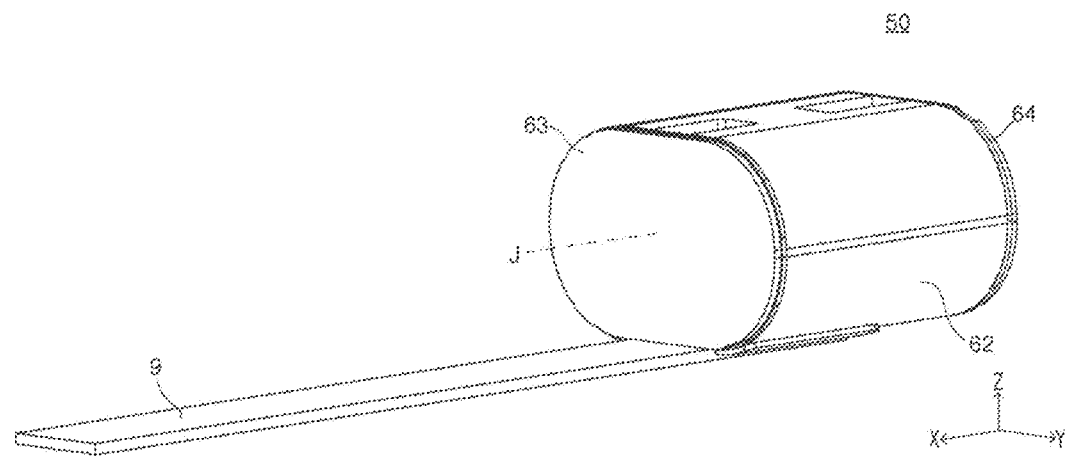
FIG. 9 is a perspective view showing an external appearance of a vibration motor according to another embodiment of the present disclosure.
Figure 10:
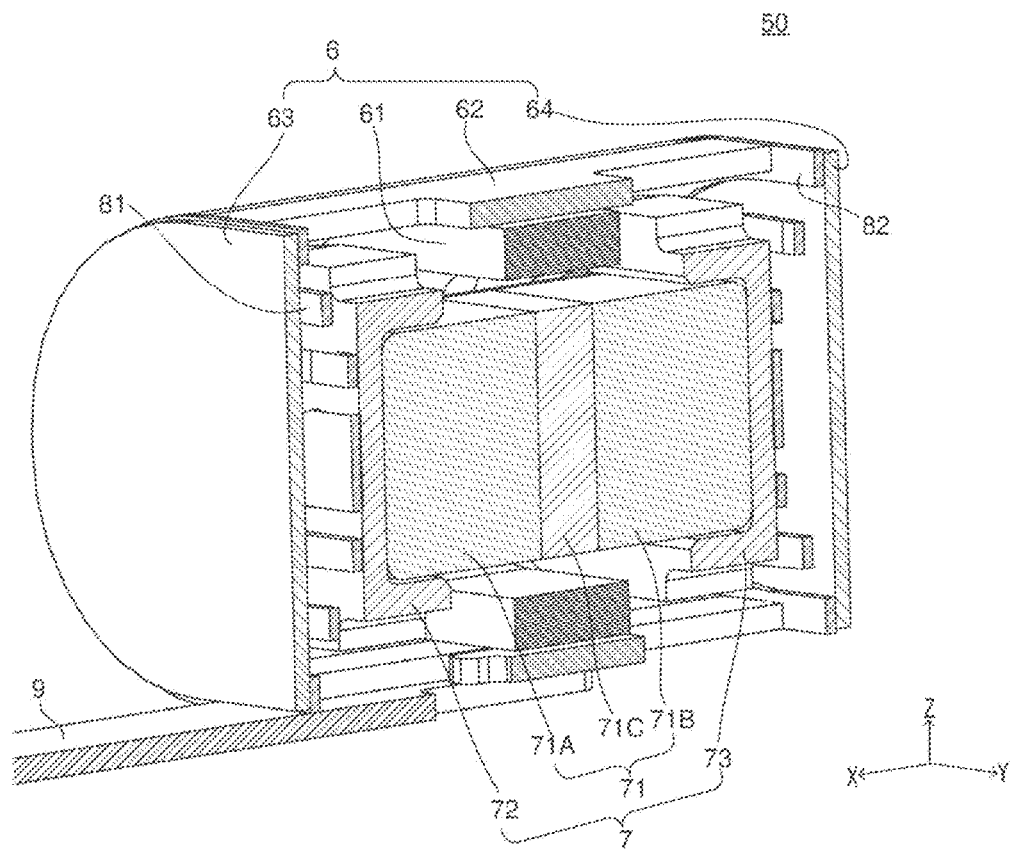
FIG. 10 is a cross-sectional perspective view of the vibration motor.

FIG. 9 is a perspective view showing an external appearance of the vibration motor 50 according to another embodiment of the present disclosure. FIG. 10 is a cross-sectional perspective view of the vibration motor 50.

The vibration motor 50 includes a stationary portion 6, a movable portion 7, and elastic members 81 and 82. The movable portion 7 is capable of vibrating in the central axis direction (X direction) with respect to the stationary portion 6.

The stationary portion 6 includes a coil 61, a housing 62, and lid portions 63 and 64. The housing 62 is a plate-like member formed to extend in the circumferential direction around the central axis J as the circumferential direction. The housing 62 has a tubular shape extending in the central axis direction. The housing 62 is made of a magnetic body. The magnetic body is stainless steel, for example.

The coil 61 is formed by winding a conductive wire around the central axis J, and is fixed to the inner surface of the housing 62. That is, the housing 62 accommodates the coil 61 therein. The coil 61 generates a magnetic field by energizing. The coil 61 is disposed at a center part in the central axis direction of the housing 62.

The movable portion 7 includes a core portion 71 and holders 72 and 73, and is accommodated inside the housing 62. That is, the stationary portion 6 includes the housing 62 that accommodates the movable portion 7 and the coil 61.

The core portion 71 includes a magnet 71A on one side in the central axis direction and a magnet 71B on the other side in the central axis direction. The core portion 71 further includes a magnetic body portion 71C. The magnetic body portion 71C is disposed to be held between the magnets 71A and 71B in the central axis direction.

For example, the other side in the central axis direction of the magnet 71A is the N pole, and one side in the central axis direction is the S pole. One side in the central axis direction of the magnet 71B is the N pole, and the other side in the central axis direction is the S pole. Thus, the N poles oppose each other in the central axis direction across the magnetic body portion 71C. That is, the magnetic poles of the magnets 71A and 71B on the side opposing the magnetic body portion 71C are homopolar. Due to this, the magnetic flux flows from the S pole to the N pole in the magnets 71A and 71B, flows radially outward in the magnetic body portion 71C, and penetrates the coil 61 in the radial direction. With the housing 62 made of a magnetic body, the magnetic flux having penetrated the coil 61 flows in the housing 62 in the central axis direction and is returned to the S poles of the magnets 71A and 71B. Such configuration makes it possible to enhance the amount of magnetic flux penetrating the coil 61.

The N pole and the S pole of the magnet may be reversed. In this case, the magnetic flux flows in a direction opposite to the above.

The holder 72 holds a one end part in the central axis direction of the magnet 71A. The holder 73 holds the other end part in the central axis direction of the magnet 71B. The holders 72 and 73 function as weights, and are made of a tungsten alloy, for example.

The elastic members 81 and 82 are compression springs that can expand and contract in the central axis direction. The other end part in the central axis direction of the elastic member 81 is fixed to a one end face in the central axis direction of the holder 72. The one end part in the central axis direction of the elastic member 81 is fixed to a one end face in the central axis direction of the housing 62.

The one end part in the central axis direction of the elastic member 82 is fixed to the other end face in the central axis direction of the holder 73. The other end part in the central axis direction of the elastic member 82 is fixed to the other end face in the central axis direction of the housing 62.

The lid portions 63 and 64 are plate-like members whose thickness direction is the central axis direction. The lid portion 63 is disposed on one side in the central axis direction of the elastic member 81, and is fixed to one end part in the central axis direction of the elastic member 81. The lid portion 64 is disposed on the other side in the central axis direction of the elastic member 82, and is fixed to the other end part in the central axis direction of the elastic member 82.

In a non-operational state in which the coil 61 is not energized, the movable portion 7 is in a stopped state by application of the elastic force toward the other side in the central axis direction by the elastic member 81 compressed from the natural length state and the elastic force toward the one side in the central axis direction by the elastic member 82 compressed from the natural length state. In the non-operational state, the magnetic body portion 71C of the movable portion 7 is located at the center position of the coil 61 in the central axis direction (FIG. 10). The core portion 71 is disposed radially inside the coil 61. That is, the stationary portion 6 includes the coil 61 surrounding the radially outward of the movable portion 7.

When the coil 61 is energized, driving force is applied to the core portion 71 by an interaction between the magnetic field generated by the coil 61 and the magnetic field generated by the core portion 71. When the driving force is applied to the movable portion 7, the movable portion 7 vibrates in the central axis direction.

Thus, since the vibration motor 50 can be configured not to use a shaft that guides the movable portion unlike the conventional case, it is possible to suppress reduction in the weight of the movable portion 7 and the volume of the core portion 71. Therefore, it is possible to secure the amount of vibration of the vibration motor 50. Sliding between the movable portion and the shaft is eliminated, and noise and wear due to sliding are avoided.

Figure 11:
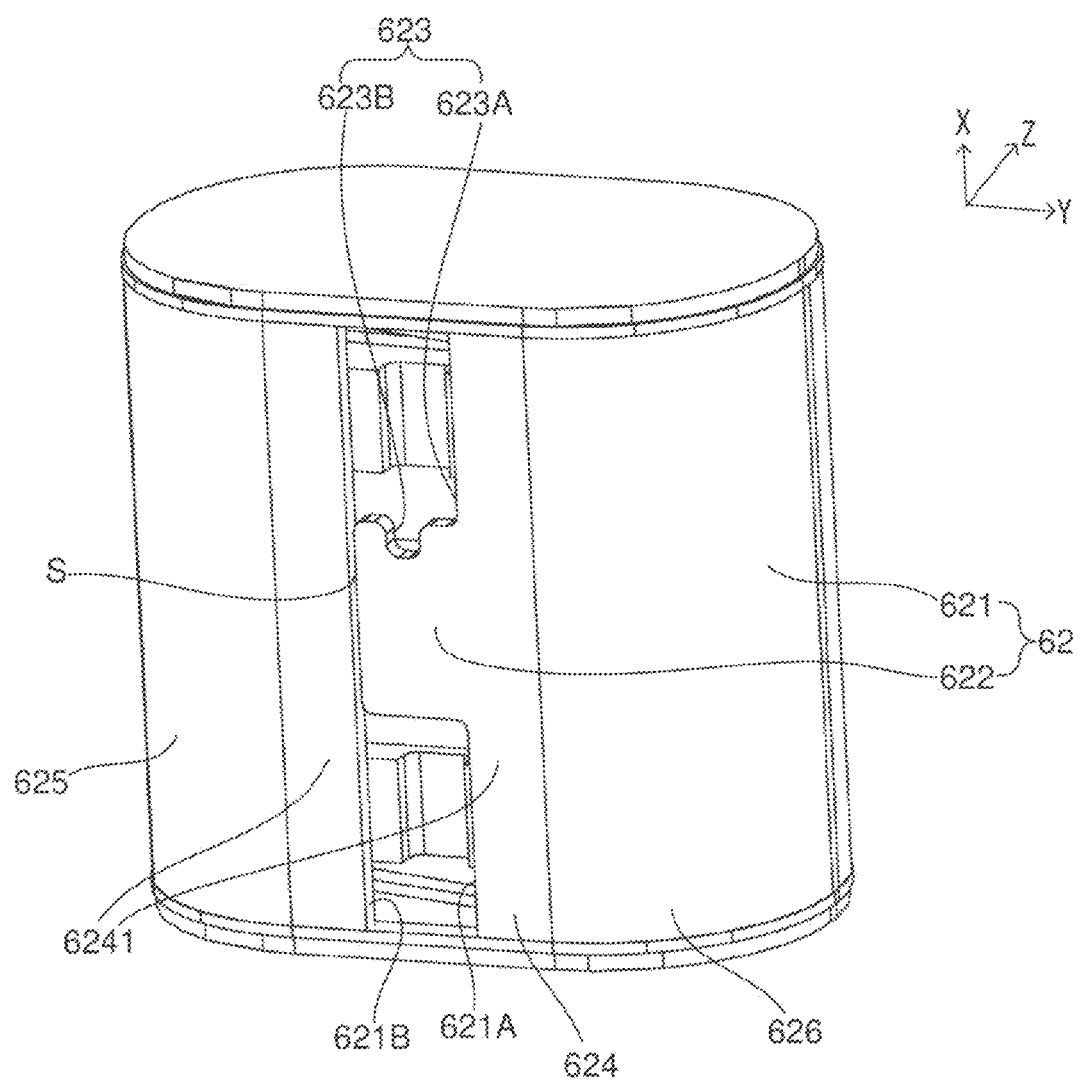
FIG. 11 is a perspective view of a partial configuration of the vibration motor as viewed from the housing first region side.

FIG. 11 is a perspective view of a partial configuration of the vibration motor 50 as viewed from a housing first region 624 side. As shown in FIG. 11, the housing 62 includes a continuous part 621 formed continuously in the circumferential direction, and a protrusion part 622 protruding to one side in the circumferential direction from a one side end part 621A in the circumferential direction of the continuous part 621. The protrusion part 622 has a gap S with the other end part 621B in the circumferential direction of the continuous part 621.

Figure 12:
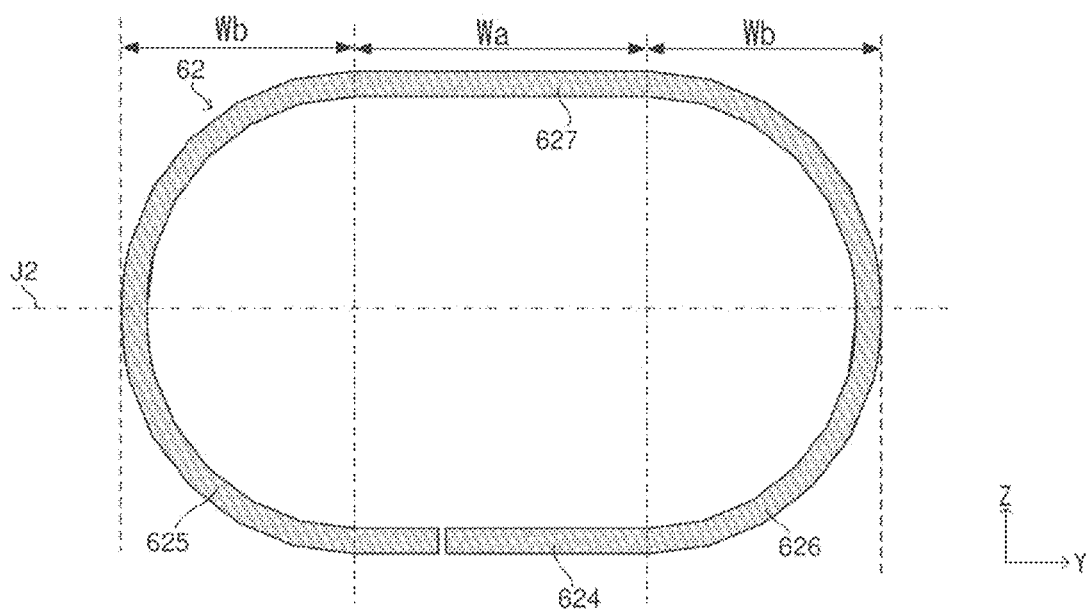
FIG. 12 is a cross-sectional view of the housing.

The protrusion part 622 is located at the center of the housing 62 in the central axis direction. Here, FIG. 12 is a cross-sectional view of the housing 62. FIG. 12 is a view of a state in which the housing 62 is cut at the position of the protrusion part 622 with a cut surface orthogonal to the central axis, as viewed from the one side in the central axis direction. The housing 62 includes the housing first region 624, a housing second regions 625 and 626, and a housing third region 627. The housing first region 624 expands in the first direction. The housing second regions 625 and 626 are disposed on both sides of the housing first region 624 in the first direction. The housing third region 627 is disposed on one side in the second direction relative to the housing first region 624, expands in the first direction, and is connected to the housing first region 624 in the second direction by the housing second regions 625 and 626. The housing first region 624 and the housing third region 627 are flat planar parts.

As shown in FIG. 12, in a cross-sectional view orthogonal to the central axis direction, the shape formed by the housing first region 624, the housing second regions 625 and 626, and the housing third region 627 is symmetrical with respect to the axis J2 extending parallel to the first direction through the center position of the housing 62 in the second direction.

In the cross-sectional view, the housing second regions 625 and 626 have a bent part bent in an arc shape. In the cross-sectional view, a width Wa of the housing first region 624 in the first direction is larger than a width Wb of the housing second regions 625 and 626 and smaller than twice the width Wb of the housing second regions 625 and 626. For example, Wa=2.3 mm and Wb=1.8 mm.

Due to this, when equipping the vibration motor 50 onto the haptic device, it is possible to easily manufacture the vibration motor 50 having a high occupancy with respect to the chassis of the haptic device. If the width of the housing first region 624 is smaller than the width of the housing second regions 625 and 626, a vertically long shape is obtained, and if the width of the housing first region 624 is longer than twice the width of the housing second regions 625 and 626, a horizontally long shape is obtained. Therefore, a dead space in the chassis becomes large. As long as the above conditions are satisfied, the housing first region (third region) may be expanded in order to increase the contact area with the substrate provided in the chassis, or the radius of the bent part of the housing second region may be increased in order to facilitate manufacturing.

As shown in FIG. 11, a first notch part 623A is formed by being surrounded by the other end part 621B in the circumferential direction, the one side end part 621A in the circumferential direction, and the protrusion part 622. A second notch part 623B is formed by being recessed from one end in the central axis direction to the other side in the central axis direction of the protrusion part 622. Thus, the housing 62 can be manufactured by bending one plate material, and the first notch part 623A and the second notch part 623B can be easily formed. In this manner, the housing 62 is formed by bending one plate-shaped member. The housing 62 can be manufactured at low cost by bending of a member of one plate-shaped portion.

The first notch part 623A and the second notch part 623B constitute a notch part 623. The notch part 623 is recessed from the one side end in the central axis direction of the housing 62 to the other side in the central axis direction. That is, the housing 62 has the notch part 623 recessed inward from the outer edge.

Figure 13:
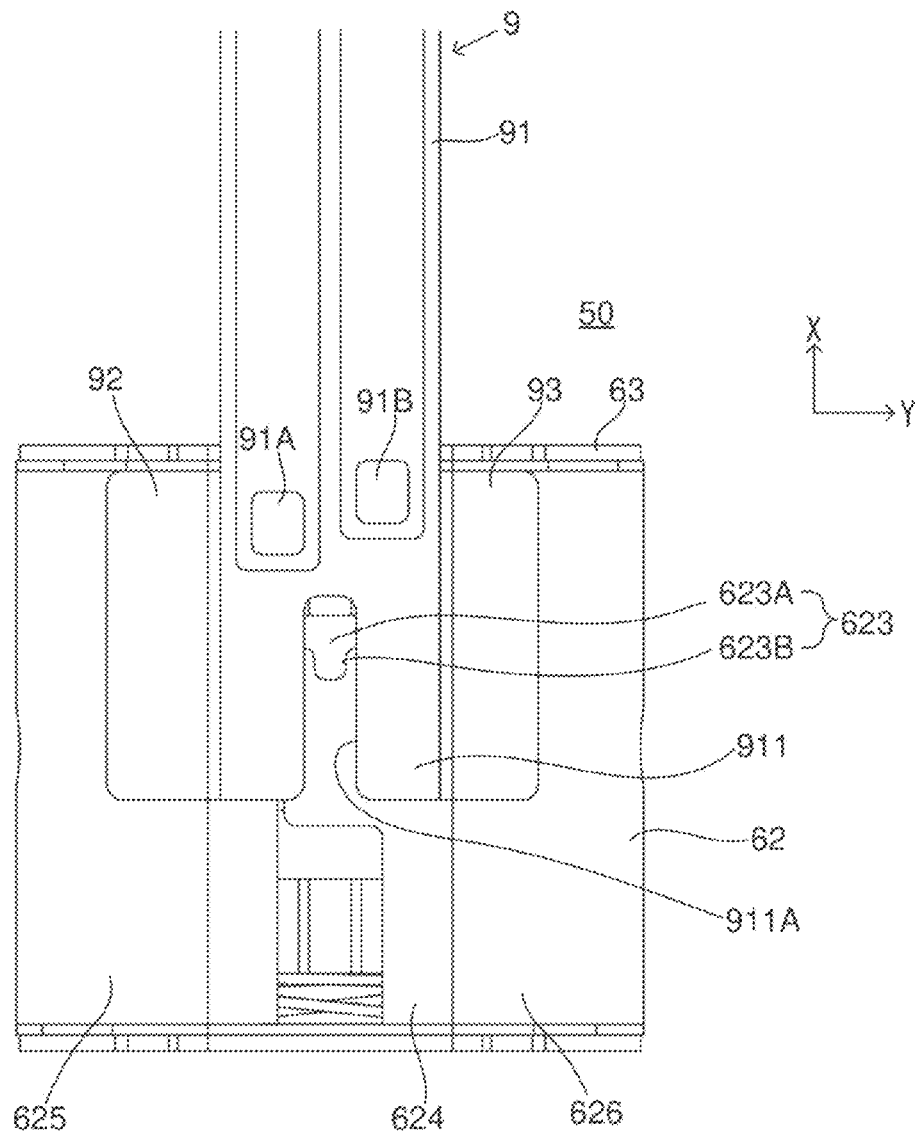
FIG. 13 is a plan view showing a partial configuration of the vibration motor.

A lead wire (not illustrated) of the coil 61 is drawn out of the housing 62 through the notch part 623. Here, FIG. 13 is a plan view showing a partial configuration of the vibration motor 50. FIG. 13 is a view of the housing 62 as viewed in a direction perpendicular to the housing first region 624.

As shown in FIG. 13, a flexible printed circuit (FPC) 9 is fixed to the housing 62. The FPC 9 has a base part 91 extending in the central axis direction. The other end part 911 in the central axis direction of the base part 91 is fixed to the outer peripheral surface of the housing first region 624. The base part 91 protrudes and extends from the lid portion 63 to the other side in the central axis direction. That is, the stationary portion 6 includes the FPC 9 fixed to the outer peripheral surface of the housing first region 624.

The base part 91 has electrode parts 91A and 91B. The lead wire drawn out from the second notch part 623B is connected to the electrode parts 91A and 91B. That is, the lead wire of the coil 61 is drawn out from the notch part 623 and electrically connected to the FPC 9. Thus, in the vibration motor 50 of the present embodiment, since the lead wire of the coil 61 is connected to the FPC 9 outside the housing 62, the workability of connection is improved.

As shown in FIG. 11, the housing first region 624 includes the protrusion part 622 and both side parts 6241 in the circumferential direction of the protrusion part 622. The both side parts 6241 in the circumferential direction extend in the central axis direction.

As shown in FIG. 13, the other end part 911 in the central axis direction in the FPC 9 is fixed so as to cover a part of the first notch part 623A. The other end part 911 in the central axis direction may be fixed so as to cover the entire first notch part 623A. That is, the FPC 9 is fixed to the outer peripheral surface of the first region 624 so as to cover at least a part of the first notch part 623A. This makes it possible to suppress the lead wire drawn out from the notch part 623 from swinging in the notch part 623.

As shown in FIG. 13, the other end part 911 in the central axis direction in the FPC 9 has an FPC notch part 911A recessed on one side in the central axis direction. The lead wire of the coil 61 is drawn out through the notch part 623 and the FPC notch part 911A.

When fixing the FPC 9 to the housing 62, it is possible to move the FPC 9 from one side in the central axis direction to the other side and put the lead wire into the FPC notch part 911A, so that the FPC 9 can be easily fixed. Since both side parts holding the FPC notch part 911A are fixed to the housing 62, the fixing area is increased and the fixing can be reinforced.

As shown in FIG. 13, the FPC 9 is provided with a protrusion piece 92 protruding from the other end part 911 in the central axis direction to one side in the circumferential direction and a protrusion piece 93 protruding from the other end part 911 in the central axis direction to the other side in the circumferential direction. The protrusion piece 92 is fixed to the outer peripheral surface of the housing second region 625. The protrusion piece 93 is fixed to the outer peripheral surface of the housing third region 626. That is, the FPC 9 is fixed to the housing first region 624 and the housing second regions 625 and 626. This increases the contact area of the FPC 9 with respect to the housing 62, thereby improving the fixing strength of the FPC 9.

Figure 14:
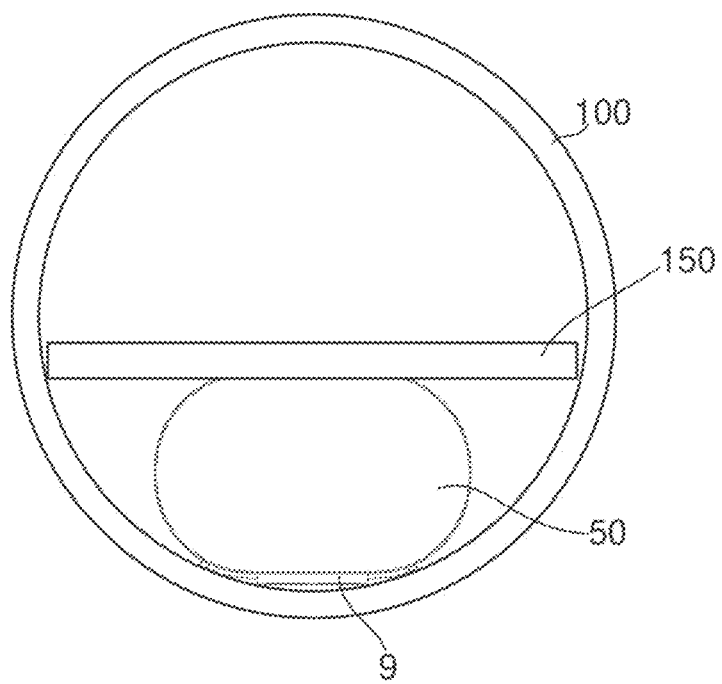
FIG. 14 is a view of a state in which the vibration motor is equipped on an example of a chassis of a haptic device as viewed in the central axis direction.

FIG. 14 is a view of a state in which the vibration motor 50 is equipped on a chassis 100 of a haptic device as viewed in the central axis direction. As shown in FIG. 14, the vibration motor 50 is disposed so that the FPC 9 is along the inner surface of the chassis 100. A substrate 150 provided inside the chassis 100 is provided on the outer surface of the vibration motor 50 on the side opposite to the FPC 9 side. The FPC 9 and the substrate 150 are electrically connected. The shape of the housing 62 described above can increase the occupancy of the vibration motor 50 in the chassis 100.

The present disclosure can be used for a vibration motor equipped to various apparatuses such as a stylus, for example.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A vibration motor comprising:
   a stationary portion; and
   a movable portion capable of vibrating in a central axis direction with respect to the stationary portion,
   wherein the stationary portion includes
a coil surrounding a radially outward of the movable portion, and
a housing accommodating the movable portion and the coil,
the housing includes
a housing first region expanding in a first direction orthogonal to the central axis direction, and
a housing second region disposed on one side in a second direction orthogonal to the central axis direction and the first direction relative to the housing first region and expanding in the first direction,
in a cross-sectional view orthogonal to the central axis direction, a distance in the second direction between the housing second region and the housing first region is longest at a center position in the first direction of the housing first region, and
in the cross-sectional view, a shape formed by the housing first region and the housing second region is asymmetric with respect to an axis extending parallel to the first direction through a center position of the housing in the second direction.

2. The vibration motor according to claim 1, wherein the housing second region is a site that connects one end part in the first direction and another end part in the first direction of the housing first region, is convex on one side in the second direction, and has an arc shape in at least a part in the cross-sectional view.

3. The vibration motor according to claim 1, wherein the coil includes
a coil first region along the housing first region, and
a coil second region along the housing second region.

4. The vibration motor according to claim 1, wherein the housing is formed by bending a single plate-shaped member.

5. The vibration motor according to claim 1, wherein
the movable portion includes an outward site disposed on one side or another side in the central axis direction of the coil, and
the outward site has a third outer surface along the housing first region and a fourth outer surface along the housing second region.

6. The vibration motor according to claim 5, wherein
the movable portion includes a magnet and a holder to which an elastic member is fixed and which holds the magnet, and
the outward site is the holder.

7. A haptic device comprising:
a tubular chassis extending in the central axis direction; and
the vibration motor according to claim 1 accommodated in the chassis.

8. The haptic device according to claim 7, wherein in the cross-sectional view, a distance between at least apart of the housing second region and a radially inner surface of the chassis is substantially constant in a circumferential direction.

9. The haptic device according to claim 7, comprising a substrate accommodated in the chassis,
wherein the housing first region is fixed to the substrate.

10. The haptic device according to claim 9, wherein the substrate is disposed on another side in the second direction relative to a center position in the second direction of the chassis.

11. The haptic device according to claim 9, wherein a length of the housing in the central axis direction is equal to or less than half of a length of the substrate in the central axis direction.

12. The haptic device according to claim 9, wherein
the housing first region has a notch part recessed inward from an outer edge, and
a lead wire of the coil is electrically connected to the substrate through the notch part.

13. The haptic device according to claim 9, wherein the substrate is disposed on one side in the central axis direction relative to a center position in a central axis direction of the chassis.

14. The vibration motor according to claim 1, wherein the housing first region is a flat plate-like site expanding in the first direction.

15. The vibration motor according to claim 14, wherein the housing first region has a notch part recessed inward from an outer edge.

16. The vibration motor according to claim 15, wherein the notch part is disposed at the center position in the first direction of the housing first region.

17. The vibration motor according to claim 15, wherein the notch part is disposed at an end part in the first direction of the housing first region.

18. The vibration motor according to claim 15, wherein
the stationary portion further includes an FPC fixed to an outer peripheral surface of the housing first region, and
a lead wire of the coil is drawn out from the notch part and electrically connected to the FPC.

19. The vibration motor according to claim 18, wherein the FPC is fixed to the housing first region and the housing second region.

20. A vibration motor comprising:
a stationary portion; and
a movable portion capable of vibrating in a central axis direction with respect to the stationary portion,
wherein
the stationary portion includes
a coil surrounding a radially outward of the movable portion, and
a housing accommodating the movable portion and the coil,
the housing includes
a housing first region expanding in a first direction orthogonal to the central axis direction,
housing second regions disposed on both sides of the housing first region in the first direction, and
a housing third region that is disposed on one side in a second direction orthogonal to the central axis direction and the first direction relative to the housing first region, expands in the first direction, and is connected to the housing first region in the second direction by the housing second region, and
in a cross-sectional view orthogonal to the central axis direction,
a shape formed by the housing first region, the housing second region, and the housing third region is symmetrical with respect to an axis extending parallel to the first direction through a center position of the housing in the second direction,
the housing second region has a bent part bent in an arc shape, and
a width of the housing first region in the first direction is larger than a width of the housing second region and smaller than twice the width of the housing second region.

* * * * *